US005277400A

United States Patent [19]

Bierther

[11] Patent Number: 5,277,400

[45] Date of Patent: Jan. 11, 1994

[54] HIGH-PERFORMANCE VALVE

[76] Inventor: Hans D. Bierther, Hunsruckstrasse 39, D-6200, Wiesbaden, Fed. Rep. of Germany

[21] Appl. No.: 14,799

[22] Filed: Feb. 8, 1993

[30] Foreign Application Priority Data

Feb. 5, 1992 [DE] Fed. Rep. of Germany ....... 4203198

[51] Int. Cl.[5] ............ F16K 31/06

[52] U.S. Cl. ............ 251/129.18; 251/129.21; 239/585.1; 239/585.4

[58] Field of Search ............ 251/129.21, 129.18; 239/585.1, 585.4

[56] References Cited

U.S. PATENT DOCUMENTS 4,932,439 6/1990 McAuliffe, Jr. ........... 251/129.21 X
4,984,744 1/1991 Babitzka et al. ........... 251/129.21 X
5,085,402 2/1992 O'Dell ........... 251/129.21

*Primary Examiner*—Arnold Rosenthal
*Attorney, Agent, or Firm*—Mason, Kolehmainen, Rathburn & Wyss

[57] ABSTRACT

A high-performance valve for the application in dot or line form of hot or cold fluid product is electromagnetically actuable and comprises a statonary piston member and a movable valve piston which bears against a valve scat to close the valve opening under the force of a biasing spring supported against the stationary piston member. The product is first fed into an annular chamber around a portion of the piston member and then flows through flow openings formed by recesses in the piston member. The recesses are arranged eccentrically and open to the outside periphery of the piston member and extend as far as the end thereof which is towards the valve piston. The valve piston is in the form of a sleeve member with a bottom portion which is towards the valve seat. The wall of the sleeve member has slots which extend inwardly therethrough and which terminate in an outward direction in the region of the bottom portion of the sleeve member where they communicate with a further annular chamber in the region of the valve seat. From the recesses in the stationary piston member the product to be applied then flows through the slots into the further annular chamber, to be discharged from the valve through an applicator nozzle.

13 Claims, 3 Drawing Sheets

HIGH-PERFORMANCE VALVE

BACKGROUND OF THE INVENTION

One form of high-performance valve for applying cold or hot fluid product in dot or line form, involves electromagnetic actuation and comprises a piston which is disposed in a solenoid and which is in two parts. One of the parts of the piston is a piston member which is stationary in operation while the other part of the piston is a valve piston which bears against a valve seat under the effect of a biasing force and which is braced against the stationary piston and which in the closed condition of the valve closes off a valve opening. The valve has feed devices for the feed of the fluid product to be applied, and through-flow openings for the fluid product are provided in the region of the piston. The fluid product to be applied may be for example dye, ink, oil, adhesives, thermoplastic fluids, fusion adhesives and the like. A valve of that design configuration is to be found for example in DE 38 474 Al.

In that valve, the fluid product is supplied through a central passage which is disposed in the stationary piston and which opens into a central distribution chamber. The through-flow openings which are provided in the region of the valve piston are of such a configuration that they are formed on the one hand by a concentric bore which extends over a part of the longitudinal extent of the valve piston and which communicates with a recess, through a discharge flow bore, at the lower end of the concentric bore. That configuration involves repeated transverse deflections of the fluid flowing through the passage, and that prevents a smooth flow of fluid from taking place through the valve.

The valve piston in the above-discussed valve is relatively long and is guided separately above the valve seat. The valve piston is also of relatively large mass and is moved only by about a quarter in the coil body or former of the solenoid unit. The design configuration of the valve piston means that the cyclic performance of the valve is limited, on the one hand as a result of the large mass of the valve piston which has to be accelerated and decelerated again in each cycle of operation of the valve, and on the other hand because of the flow of fluid which acts on the piston and which is only very poorly distributed around the piston. Another disadvantage of that valve is that it can suffer from overheating, in particular when required to operate at high levels of cyclic performance. If the temperature of the valve exceeds a certain limit, that will give rise to problems and operational deficiencies.

SUMMARY OF THE INVENTION

An object of the present invention is to provide a valve for applying fluid product, which may be hot or cold, in for example dot or line form, which does not suffer from the above-mentioned disadvantages of the prior valve.

Another object of the present invention is to provide a high-performance valve for applying fluid product, which permits a very high level of cyclic performance while nonetheless producing satisfactory operational results.

In accordance with the present invention, the foregoing and other objects are achieved by a high-performance valve for applying fluid product, for example in dot or line form, which may be hot or cold, comprising a solenoid, a valve seat providing a flow opening, and a piston assembly which is disposed in the solenoid and which includes first and second parts. One piston part is a piston member which is stationary in operation of the valve while the other piston part is a valve piston which is supported against the stationary piston and which is urged towards the valve seat under the effect of a biasing force, to close the flow opening. The valve includes feed means for the feed of fluid product to be applied. An at least substantially annular chamber is provided around the stationary piston member, while a feed passage communicates with that chamber to feed product thereto. The stationary piston member has recesses which join to the annular chamber and which are arranged eccentrically and open to the outside periphery of the stationary piston member and which extend to the end thereof which is towards the valve piston, to carry the flow of product in the region of the stationary piston member. The valve piston is in the form of a sleeve member of a reducing configuration at its end region towards the valve seat, with the bottom of the sleeve member being towards the valve seat and the sleeve member including a wall having slots which pass inwardly therethrough and which terminate outwardly in the region of its bottom. A further at least substantially annular chamber for the product is provided in the region of the valve seat, the slots in the sleeve member communicating with the further chamber to form a flow path for the product, in the region of the valve piston jointly with the inside region of the sleeve member.

As will be seen in greater detail hereinafter, the valve according to the invention enjoys the advantage that the configuration of the valve piston in the form of a slotted sleeve means that the valve piston is of small mass and thus low weight and opposes only a low level of resistance to the fluid flowing past it. The configuration of the through-flow openings in the region of the valve piston and the stationary piston member provides for an advantageous flow path for the fluid product as it flows through the valve, without the fluid having to change direction substantially at a plurality of locations. Thus the valve according to the invention has advantageous flow properties on the one hand while on the other hand it involves a very low weight in regard to the movable component, namely the valve piston, so that the rise in temperature which occurs in operation of the valve can be minimised. Depending on the nature of the fluid to be applied by the valve, the valve according to the invention can produce for example more than fifteen hundred dots or points of applied fluid per second, and correspondingly more than three thousand switching movements per second.

In a preferred feature of the invention, the solenoid may have a coil which is enclosed at its inward side and at its ends by a coil body or former of plastic material having good sliding properties, good heat conduction properties, low wearing properties and high density, while the coil is enclosed on its outward side by an iron jacket. That arrangement provides that the heat which occurs at a high level of cyclic performance, as a result of the supply of electrical energy to the solenoid, can be carried away or dissipated in a satisfactory fashion.

In a further preferred feature of the invention, in addition to the slots, the valve piston may have openings or recesses which are distributed around its periphery and which are continuous in the longitudinal direction thereof. That provides that the valve piston can move as freely as possible in the fluid. In a further configuration in this respect the openings or recesses in the valve piston may be of different cross-sections.

In accordance with another preferred feature of the invention, the annular chamber which is communicated with the feed passage may be in the form of a cross-sectional reduction which extends over the periphery of the stationary piston member. That provides a particularly good communication between the annular chamber and the recesses in the stationary piston member.

A further embodiment of the invention can provide that the stationary piston member can be in the form of an adjusting piston which is provided with a screwthread which can be screwed into the housing of the valve, at the end of the adjusting piston which in the position of use is remote from the valve piston. That design configuration provides that the stationary piston member is displaceable or adjustable in the longitudinal direction thereof. That affords the possibility of adjusting the valve to the individual characteristics of the fluids to be used, at a high level of cyclic performance. This design affords the advantage in regard to maintenance operations that removing the adjusting screw by screwing it out of the valve housing means that the entire piston, that is to say the adjusting piston and the valve piston, can be removed in a simple fashion, without the need to dismantle the entire valve. That is an aspect of major advantage for example when carrying out valve cleaning operations or in the event of blockage of the valve seat.

A further configuration of the invention can provide that the closing face of the valve piston, which bears against the valve seat around the valve opening, can be of an elastic configuration and has a flat surface while the valve seat has a closing face of a rounded or part-spherical configuration. That guarantees a satisfactory closure effect when the valve is operating at a high level of cyclic performance and prevents the fluid to be applied from dripping out when the valve is in the stopped condition. In addition the piston is automatically centered against the sealing face of the valve seat.

A further embodiment of the invention can provide that the discharge passage which adjoins the rounded closing face, in the discharge opening, has a reduction in its cross-section. That is advantageous in particular for applying fluid products of higher viscosity.

Another embodiment of the invention can provide that an applicator nozzle which is disposed in the valve head of the valve according to the invention is of a rounded configuration at its outward side in the region of the shooting passage through which the fluid product issues to be applied in for example dot or line form. That configuration is advantageous if the value is installed in different positions as the fluid product to be applied cannot accumulate at the tip of the nozzle, by virtue of the rounded-off configuration.

A further preferred feature of the invention may provide that the applicator nozzle and/or the coil core of the solenoid unit comprises a material with which the fluid product to be applied does not become involved in a firm bond thereto. The advantage in that respect is that residues of the product to be applied exhibit little or no deposit phenomena, in comparison for example with metals, so that the risk of the product drying up in the valve and the risk of valve blockage area reduced as a result.

In a further advantageous feature of the invention the coil former of the solenoid may be of such a length in the longitudinal direction of the valve that the stationary piston member and the valve piston are substantially enclosed by the coil former. In comparison with the prior arrangement discussed above, that affords the advantage that the magnetic force generated by the solenoid unit fully acts on the valve piston and magnetic leakage losses are at least substantially reduced.

A further configuration according to the invention may also provide that the valve seat is of a conical configuration, with the closing face of the valve piston being in the form of a ball. That configuration can also be used to provide for satisfactory processing of viscous fluids as the viscous fluid is abruptly cut off at the valve seat when the valve closes.

It is also possible to fit nozzles of different configurations for the application of different fluids.

Further objects, features and advantages of the invention will be apparent from the following description of preferred embodiments.

DESCRIPTION OF PREFERRED EMBODIMENTS

Figure 1:
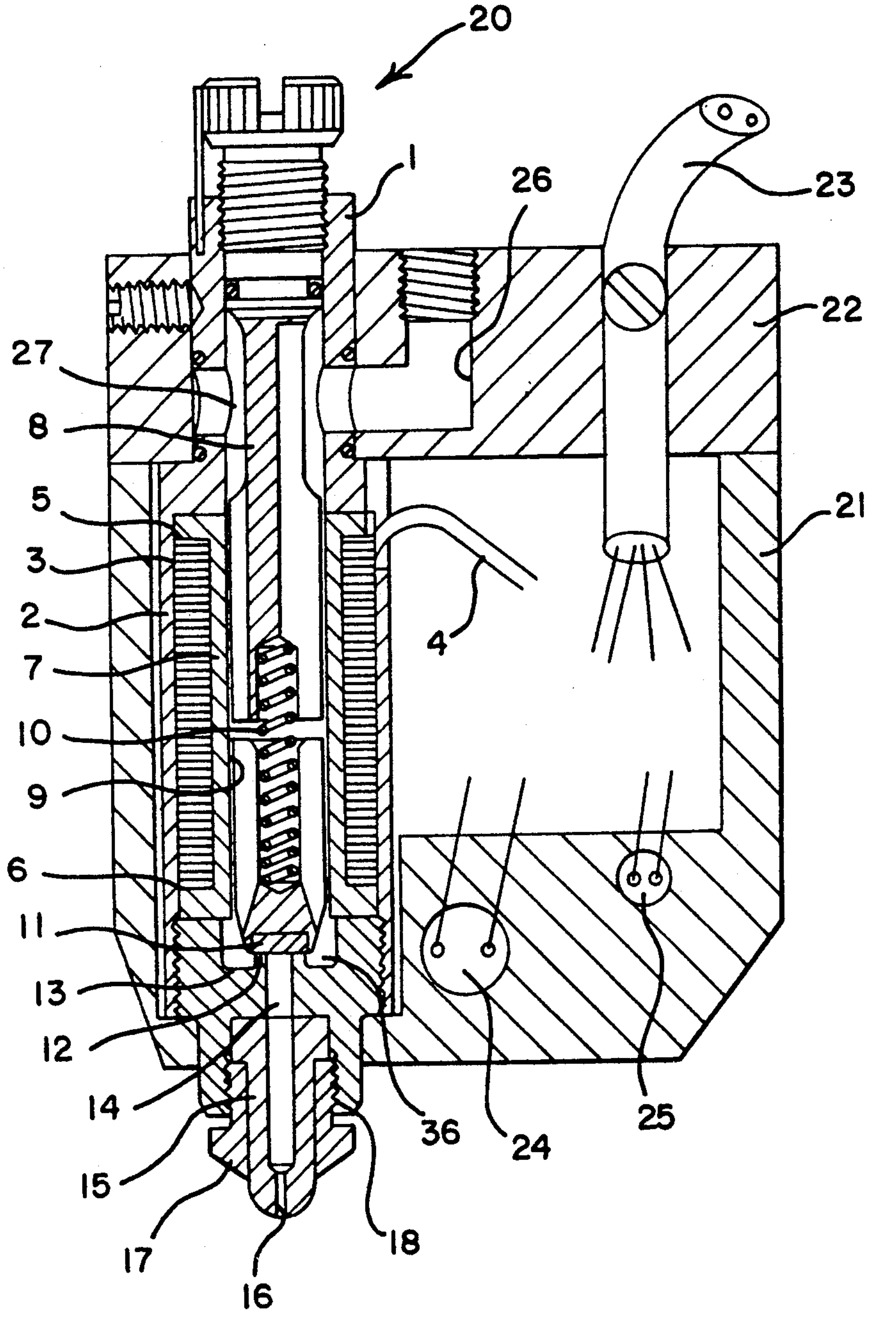
FIG. 1 is a diagrammatic view in longitudinal section through an embodiment of the valve according to the invention.
Figure 2:
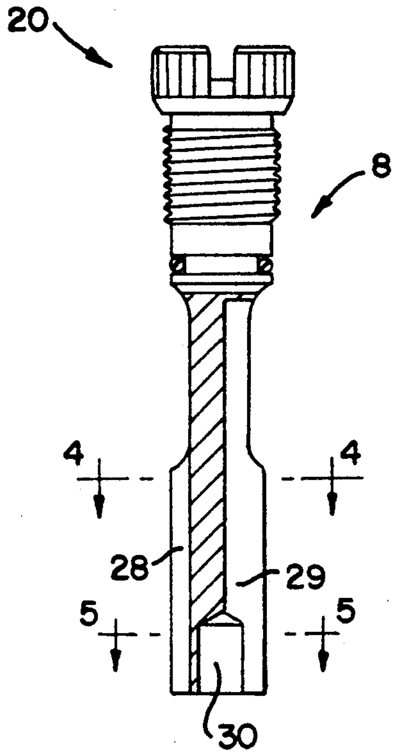
FIG. 2 is a partly sectional side view of the stationary piston member of the valve shown in FIG. 1.
Figure 4:
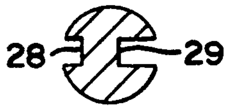
FIG. 4 is a view in section taken along line IV—IV in FIG. 2.
Figure 5:
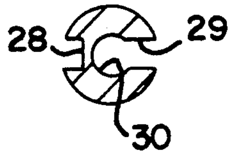
FIG. 5 is a view in section taken along line V—V in FIG. 2.
Figure 3:
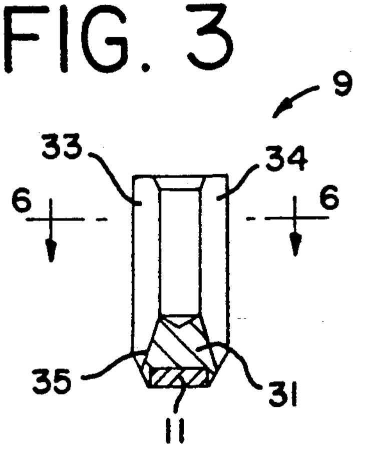
FIG. 3 is a view of the valve piston of the FIG. 1 valve, in longitudinal section through the center thereof.

Referring firstly to FIG. 1, a high-performance valve shown therein for the application of a fluid product which may be hot or cold, in dot or line form, with a high level of cyclic performance, comprises a valve housing 1 whose region which is downward in FIG. 1 has an iron jacket 2. Disposed in the iron jacket 2 is a coil 3 of a solenoid to which electrical energy is supplied through a line 4. At its inside and at its two ends as indicated at 5 and 6 the coil 3 is enclosed by a coil body or former 7. The coil body 7 comprises plastic material with good sliding properties, good heat conduction properties, low wearing properties and high density.

Disposed in the interior of the valve housing 1 is a piston assembly which is in first and second parts. One part of the piston assembly is a piston member 8 which is stationary in the condition of use of the valve while the other piston part is a movable valve piston 9. The valve piston 9 is braced against the stationary piston member 8 by means of a spring 10 and, in the ciosure position shown in FIG. 1, bears with a closing face 11 which is disposed at its lower end and which is of an elastic configuration against a valve seat 12 in the lower end region 13 of the valve housing 1. Adjoining the valve seat 12 is a discharge passage 14 in a discharge nozzle 15 which comprises plastic material and which at its lower end in FIG. 1 has a shooting passage 16 of a cross-section that is reduced relative to the discharge nozzle 15. The discharge nozzle 15 is held in position by a nozzle nut 17 which is screwed into the valve head 18 of the valve housing 1.

In the illustrated embodiment, the piston member 8 which is stationary in operation of the valve is in the form of an adjusting piston. At its end region which in the condition of use is remote from the valve piston 9, the piston member 8 is provided with an adjusting screw as indicated generally at 20. The stationary piston member 8 can be displaced or adjusted in its longitudinal direction, by rotation of the adjusting screw 20.

The valve housing 1 is carried in a valve body which is indicated generally at 21 and which is closed off upwardly by a supply plate 22. Reference numeral 23 identifies an electrical supply cable. Reference numeral 24 identifies a diagrammatically illustrated heating means which can be switched on as required, while reference numeral 25 identifies a sensor. Provided in the supply plate 22 is a feed passage 26 for the liquid product to be applied, the feed passage 26 opening into an at least substantially annular chamber 27 which, in the FIG. 1 embodiment, is formed by a reduction in cross-section in a portion of the stationary piston member 8.

The piston member 8 has openings or recesses as indicated at 28 and 29 in FIGS. 2 through 5, which adjoin the annular chamber 27 downwardly and which are disposed eccentrically in the piston member 8 and which are open to the outside periphery of the piston member 8 and which extend to the end thereof which is towards the valve piston 9. In addition, at its end which is towards the valve piston 9, the piston member 8 has a central bore as indicated at 30 in FIGS. 2 and 5, which serves to accommodate one end of the coil spring 10 operatively disposed between the piston member 8 and the valve piston 9.

The valve piston 9 is in the form of a sleeve member which is open upwardly in FIG. 1 and which accommodates the other end of the spring 10. The sleeve member forming the valve piston 9 has a bottom wall as indicated at 31 in FIG. 3. The bottom 31 is towards the valve seat 12 of the valve. The wall 32 of the sleeve member forming the valve piston 9 has slots 33 and 34 which extend therethrough from the outside inwardly. At its end region which is towards the valve seat 12, the sleeve member forming the valve piston 9 is of a reducing or tapering configuration, as indicated at the region 35. The slots 33 and 34 are designed to terminate outwardly in the region of the bottom 31 of the sleeve member.

Reference numeral 36 in FIG. 1 identifies a further at least substantially annular chamber which is disposed around the valve piston 9 in the region of the valve seat 12.

It is thought that the mode of operation of the above-described valve according to the invention, by means of electromagnetic actuation involving powering of the solenoid with its coil 3 to produce opening of the valve by movement of the valve piston 9, whereby the fluid product can flow from the feed passage through the recesses 28 and 29 and the slots 33 and 34 in the valve piston and thence through the opening of the valve seat 12 to be discharged from the valve nozzle will be self-evident and does not therefore need to be described in further detail herein.

Figure 6:
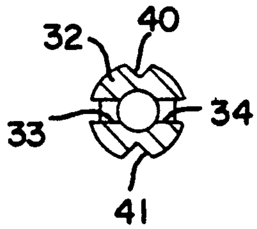
FIG. 6 is a view in section taken along line VI—VI in FIG. 3.
Figure 7:
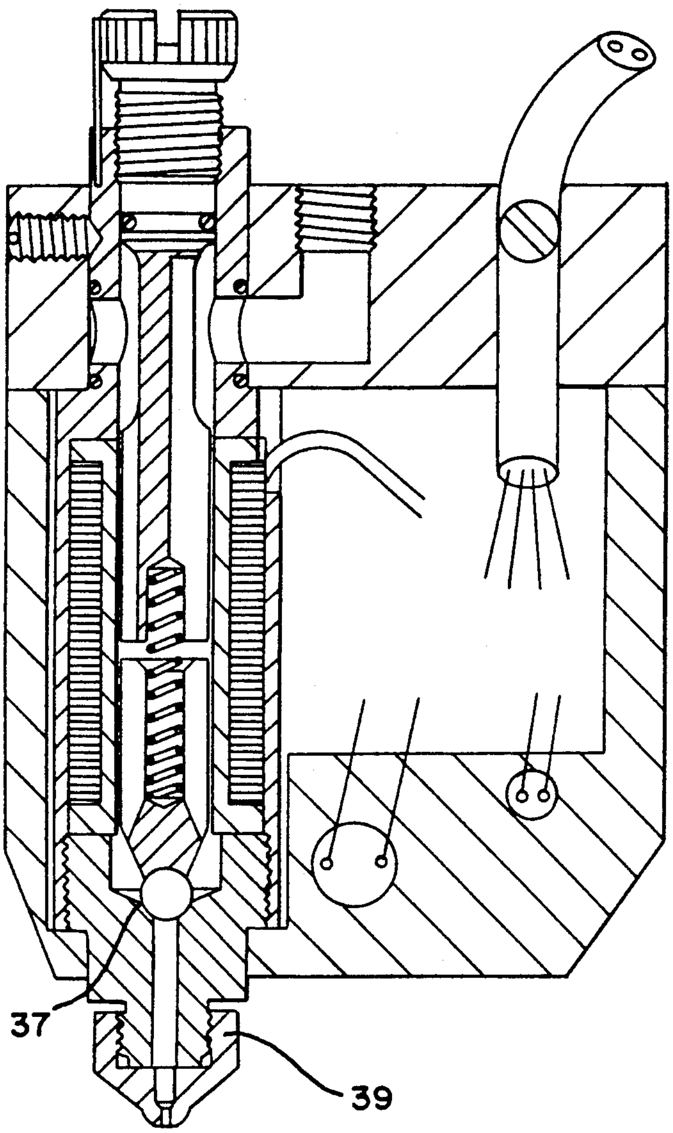
FIG. 7 is a view in longitudinal section through a further embodiment of the valve according to the invention.
Figure 8:
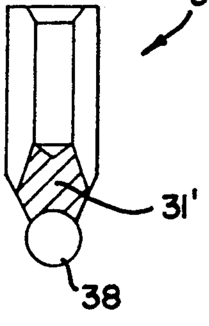
FIG. 8 is a view in longitudinal section of the valve piston in the valve shown in FIG. 7.

Reference will now to FIGS. 7 and 8 showing a further embodiment of the valve according to the present invention. In the following description of the embodiment of FIGS. 7 and 8, only those components which differ from the embodiment shown in FIGS. 1 through 6 will be described separately at this point and identified by appropriate reference numerals.

Thus, the further embodiment shown in FIGS. 7 and 8 differs from the embodiment of FIGS. 1 through 6 substantially in regard to the configuration of the valve opening and the valve closure portion. In the FIGS. 7 and 8 embodiment, the valve seat which is here identified by reference numeral 37 is of a conical configuration while the closing face of the valve piston which is here identified by reference numeral 9' is in the form of a ball or part-spherical portion indicated at 38 in FIG. 8. The ball portion 38 is mounted at the lower end of the bottom portion 31' of the valve piston 9' which once again is in the form of a sleeve member. It will be seen that the bottom portion 31' of the valve piston 9' is larger here, in comparison with the situation shown in FIG. 3.

A further difference in the embodiment of the valve according to the invention as shown in FIGS. 7 and 8 is that this valve has an interchangeable nozzle 39 having a female screwthread by which it can be screwed on to a corresponding male screwthread. In this embodiment, as in the previous embodiment as shown in FIG. 6, the valve member 9 may have recesses 40 and 41 which are distributed around its periphery and which extend continuously in the longitudinal direction thereof, in addition to the through slots 33 and 34.

It will be appreciated that the above-described embodiments of the invention have been set forth solely by way of example and illustration of the principles of the present invention and that various modifications and alterations may be made therein without thereby departing from the spirit and scope of the invention.

What is claimed is:

1. In a high-performance valve for applying fluid product comprising an electromagnetic actuation solenoid and a piston assembly which is disposed in the solenoid and which includes first and second parts, one piston part being a piston member which is stationary in operation of the valve and the other piston part being a valve piston which is supported against the stationary piston, a biasing means urging the valve piston towards the valve seat to close the flow opening thereof, feed means for the product to be applied, and through-flow means provided for the product in the region of the piston assembly, the improvement that said flow means include an at least substantially annular chamber which is disposed around said piston member, a feed passage communicating with said chamber to feed product thereto, and recess means in the piston member which adjoin said chamber and which are arranged eccentrically and which are open to the outside periphery of the piston member and which extend to the end which is towards the valve piston, to carry the flow of product in the region of the stationary piston member, and the valve piston is in the form of a sleeve member of a reducing configuration at its end region towards the valve seat, the sleeve member having a bottom portion towards the valve scat and a wall which includes slots which pass inwardly therethrough and which terminate outwardly in the region of said bottom portion of said sleeve member, and said flow means further include a second at least substantially annular chamber which is provided in the region of said valve seat and into which said slots open whereby said slots jointly with the inside region of the sleeve member form a through-flow opening for the flow of said product in the region of the valve piston.

2. A valve as set forth in claim 1 wherein said solenoid has a coil having inward and outward sides and first and second ends and wherein said coil is enclosed at its inward side and at its ends by a coil former of plastic material having good sliding properties, good heat conduction properties, low wearing properties and high density, and at its outward side by an iron jacket.

3. A valve as set forth in claim 1 wherein in addition to said slots said valve piston has recesses which are distributed around its periphery and which are continuous in the longitudinal direction thereof.

4. A valve as set forth in claim 3 wherein said recesses in the valve piston are of different cross-sections.

5. A valve as set forth in claim 1 wherein the piston member is in the form of an adjusting piston having first and second ends with its first end remote from said valve piston, and wherein its first end has an adjusting screw screwable in a valve housing portion.

6. A valve as set forth in claim 1 wherein the valve seat is of a conical configuration and the closing face of said valve piston is of a ball-like configuration.

7. A valve as set forth in claim 1 wherein said valve piston has a closing face which is adapted to co-operate with said valve seat and which is of an elastic configuration and which is an at least substantially flat surface, and wherein the valve seat has a closing face of a rounded configuration.

8. A valve as set forth in claim 7 wherein the valve has a discharge passage which adjoins the closing face of the valve seat and which has a reduction in cross-section at its outlet opening.

9. A valve as set forth in claim 1 including an applicator nozzle which is disposed on the valve head and which is rounded at its outward side in the region of its outlet opening.

10. A valve as set forth in claim 9 wherein said applicator nozzle comprises a material to which said product does not become firmly bonded.

11. A valve as set forth in claim 2 wherein said coil former of the solenoid comprises a material to which said product does not become firmly bonded.

12. A valve as set forth in claim 2 wherein the coil former of the solenoid as viewed in the longitudinal direction of the valve is of such a length that the piston member and the valve member are substantially enclosed by the coil former.

13. A valve for applying fluid product comprising: a solenoid; a valve seat providing a flow opening for the product to flow therethrough; a piston assembly which is disposed in the solenoid and which includes first and second parts, one piston part being a piston member which is stationary in operation of the valve and the other piston part being a valve piston disposed in axial alignment with the piston member, the valve piston being substantially in the form of a sleeve member of a reducing configuration at its end region towards the valve seat and the sleeve member having a bottom portion towards the valve seat and a wall having slots which pass inwardly therethrough and which terminate outwardly in the region of said bottom portion; a biasing means operatively disposed between said piston member and said valve piston and operable to bear against said stationary piston member to urge the valve piston towards the valve seat to close the flow opening; an at least substantially annular chamber around said piston member; a feed passage communicating with said chamber to feed product thereto; recess means in the piston member which communicate with said chamber and which are open to the outside periphery of the piston member and which extend to the end thereof towards the valve piston to carry the flow of product therethrough in the region of the piston member; and a further at least substantially annular chamber for the flow of product, which further annular chamber is disposed in the region of said valve seat, said slots in said sleeve member communicating with said further chamber to form a flow path for said product in the region of the valve piston.

* * * * *